US005536115A

United States Patent [19]

Keck

[11] Patent Number: 5,536,115
[45] Date of Patent: Jul. 16, 1996

[54] GENERATING MULTIPLE HYDRAULIC FRACTURES IN EARTH FORMATIONS FOR WASTE DISPOSAL

[75] Inventor: Richard G. Keck, Dallas, Tex.

[73] Assignee: Atlantic Richfield Company, Los Angeles, Calif.

[21] Appl. No.: 355,614

[22] Filed: Dec. 14, 1994

[51] Int. Cl.⁶ .............................. B09B 3/00; E21B 47/10
[52] U.S. Cl. ..................... 405/128; 166/250.1; 166/308; 588/250
[58] Field of Search .................................. 166/250, 281, 166/283, 308, 250.1; 405/59, 128; 588/249, 250

[56] References Cited

U.S. PATENT DOCUMENTS

| | | | |
|---|---|---|---|
| 3,933,205 | 1/1976 | Kiel | 166/308 |
| 5,109,933 | 5/1992 | Jackson | 405/128 X |
| 5,226,749 | 7/1993 | Perkins | 405/128 |
| 5,314,265 | 5/1994 | Perkins et al. | 405/128 |
| 5,322,126 | 6/1994 | Scott, III | 166/308 |
| 5,387,737 | 2/1995 | Schmidt et al. | 588/250 |
| 5,405,224 | 4/1995 | Aubert et al. | 405/128 |

*Primary Examiner*—George A. Suchfield
*Attorney, Agent, or Firm*—Michael E. Martin

[57] ABSTRACT

Slurried solids waste materials are disposed of into a preselected subterranean disposal zone by generating radially extending hydraulic fractures from a disposal well and filling the primary fractures with disposal material until screenout is observed or it is determined that the fracture is filled with waste material from monitoring fracture growth and measuring the injected volume of material. The fluid flow rate is allowed to decline to provide relaxation and closure of the fracture at a point between the fracture tip and the injection well and secondary fractures are then created by injecting a fracturing fluid followed by further injection of waste material to fill the secondary fractures. The process is repeated to establish a dendritic array of multiple hydraulic fractures in the disposal zone sufficient to hold a predetermined quantity of waste material.

14 Claims, 1 Drawing Sheet

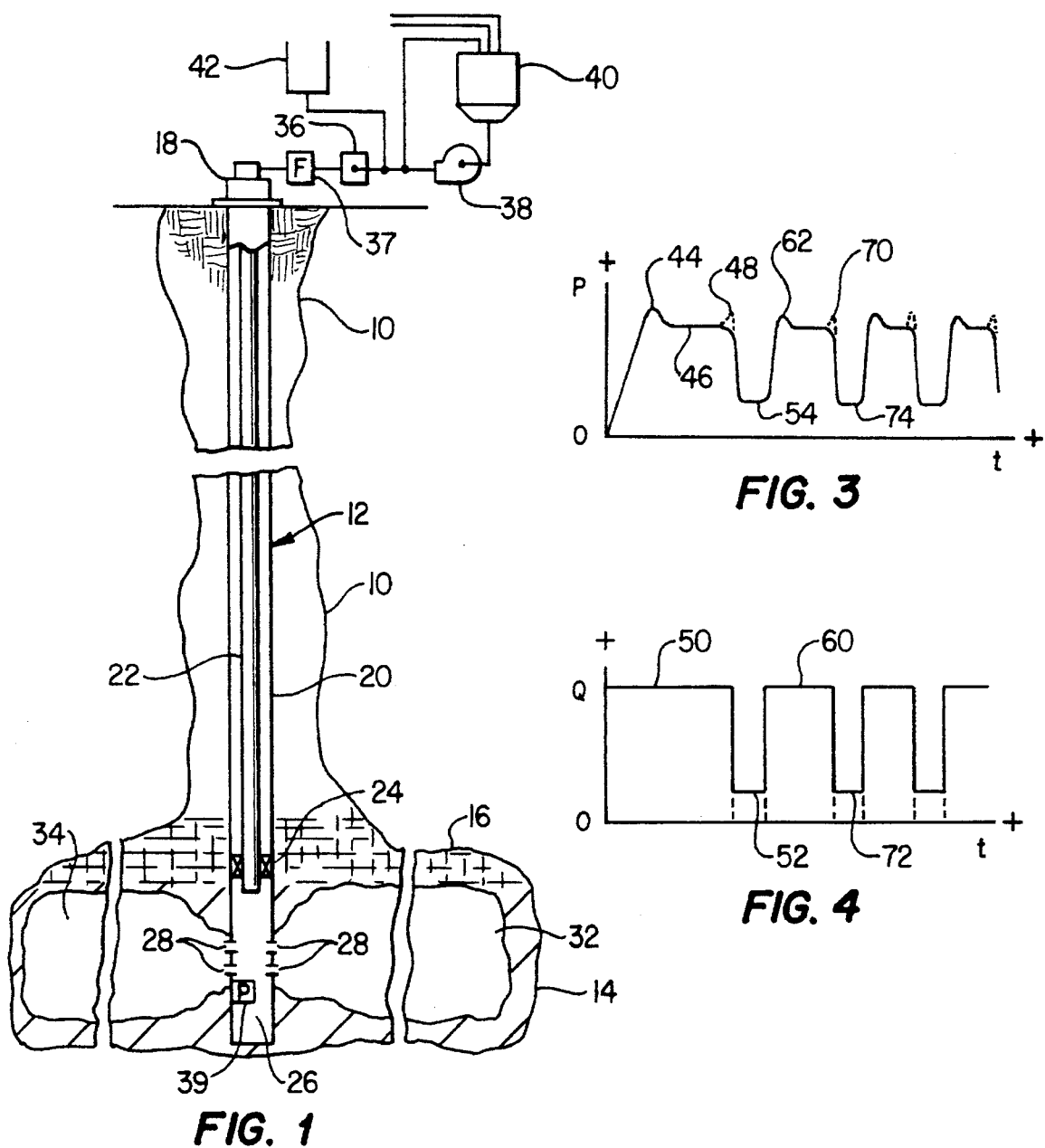
FIG. 3
FIG. 4
FIG. 1
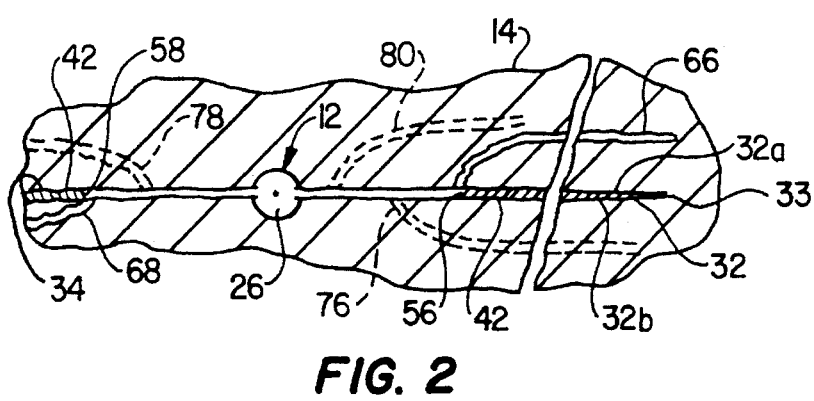
FIG. 2

GENERATING MULTIPLE HYDRAULIC FRACTURES IN EARTH FORMATIONS FOR WASTE DISPOSAL

FIELD OF THE INVENTION

The present invention pertains to an improved method for disposing of slurried solids wastes in subterranean earth formations by creating multiple hydraulic fractures extending from a disposal well.

BACKGROUND

The continuing need to consider disposing of solids wastes into subterranean earth formations has resulted in the development of several inventions for improving the quantity of wastes that may be disposed of in certain formation zones or intervals and the containment of such wastes in the chosen disposal zones. Perkins U.S. Pat. No. 5,226,749 and Perkins and Keck U.S. Pat. No. 5,314,265, both assigned to the assignee of the present invention, describe waste disposal methods wherein liquid wastes or slurried solid wastes, in particular, may be injected into subterranean earth formations from disposal wells and wherein the formations have particular physical characteristics which take advantage of the development of generally vertical two-winged hydraulic fractures extending from the disposal well and which are capable of receiving substantial quantities of waste material.

In many earth formations which may be suitable for disposal of wastes the compressive stress distribution in a selected zone which will assure containment of the waste material does permit the generation of vertical and laterally extending two-winged fractures extending from an injection well. However, the volume of waste material that may be disposed of through a particular injection well and into a particular formation zone is limited if only two opposed fracture wings are formed in a plane which is normal to the minimum in situ compressive stress and, particularly, if the formation disposal zone does not have the advantageous features described in the above-mentioned patents. Moreover, when injecting slurried solids into such an earth formation, a limiting factor in the amount of material that may be injected into the fracture is that which results from the fracture undergoing what is known in the art as "screenout". This phenomena occurs when the particulate solids carried into the fracture form a filter cake on the fracture faces and at the radial extremity or "tip" of the fracture as the carrier fluid leaks through into the formation matrix which the fracture is penetrating. Accordingly, it is desirable to contemplate the creation of multiple hydraulic fractures extending within a suitable waste disposal zone or interval. However, conventional fracturing methods and previous methods developed for disposing of liquid and slurried solids wastes have not taken into consideration a way in which multiple hydraulic fractures might be created for waste disposal purposes.

Kiel U.S. Pat. No. 3,933,205 describes a hydraulic fracturing method for fluid production wells wherein reverse flow of the fracturing fluid is carried out to effect spalling or production of formation fines into the fracture. Accordingly, the fracture is propped open and substantially filled with the spalled formation material. Kiel also contemplates that multiple fractures may extend from a vertical two-wing fracture in directions normal to the original vertical two-winged fracture since the compressive stress distribution of the formation is changed by the method of Kiel. However, this stress distribution does not extend very far from the wellbore and the secondary fractures extending from the primary two-winged fracture appear to have limited growth potential. Moreover, the method of Kiel results in the fractures being filled with formation material (fines and spalled particulates) which would not be desirable for use in connection with a method of disposing of solids waste material.

Creating multiple hydraulic fractures in subterranean earth formations for the purpose of increasing fracture volume for disposal and slurried solids wastes is considered desirable and the present invention is directed to this end.

SUMMARY OF THE INVENTION

The present invention provides a unique method for creating multiple hydraulic fractures in an earth formation from a well penetrating the formation. The invention is also directed to an improved method of disposing of slurried solids wastes, in particular, by generating multiple hydraulic fractures in an earth formation and extending from an injection well.

In accordance with an important aspect of the present invention multiple hydraulic fractures are created in a selected earth formation zone or interval by generating a first, generally vertically extending fracture, which may comprise a single fracture "wing" or have opposed fracture "wings" emanating from the well, and after a predetermined extension of said first fracture, causing said first fracture to be allowed to screen out or fill with slurried solids over a predetermined extent of the fracture length from the injection well. The method then provides for generating at least a second fracture which begins at the point of fill or screenout of the first fracture and which may extend generally parallel to the first fracture. Additional fracture wings may be extended from the first or second fracture to create a third fracture, and so on.

The invention contemplates generation of multiple fractures by initially extending a first, generally vertical fracture from a well using hydraulic fluid which has controllable leakoff characteristics so that the fracture length can be maximized. The fluid first injected may or may not comprise a slurry of particulate solids. The fracture is then partially filled, beginning at its radial extremity from the injection well, by a solids laden fluid which will permit building filter cake on the fracture faces at the portion of the fracture spaced from the injection well and filling that portion of the fracture with the solids laden fluid until the fracture is unable to accept more flow. Upon a predetermined reduction in the rate of fluid flow the fracture is allowed to close adjacent the point at which solids are accumulating in the fracture. Additional fracture volume for receipt of waste material is then developed by resuming fluid injection at a suitable pressure to create a second fracture which extends from the first fracture at the point of closure or the edge of the region in which solids have accumulated in the fracture. The process may be repeated in the second fracture to create a third fracture and so on until the material is disposed of or until the disposal zone will not accept any further waste material.

The improved method of the present invention also allows relatively large volumes of solids wastes, in slurry form, to be injected into a single well while preventing unrestrained growth of a hydraulic fracture into an unwanted zone or interval. The cost per unit volume of waste material disposed of is reduced and the method of the invention allows greater flexibility in selecting sites for disposal of solids wastes in hydraulic fractured earth formations.

Those skilled in the art will recognize the abovementioned advantages and superior features of the invention together with other important aspects thereof upon reading the detailed description which follows in conjunction with the drawing.

BRIEF DESCRIPTION OF THE DRAWING

FIG. 1 is a schematic diagram of a waste disposal well penetrating an earth formation which is being fractured for receiving wastes in accordance with the present invention;

FIG. 2 is a view of the well of FIG. 1 on a larger scale and taken in a substantially horizontal plane to illustrate the development of the multiple hydraulic fractures;

FIG. 3 is a diagram showing the injection fluid pressure as a function of time in developing the multiple hydraulic fractures in accordance with the method of the invention; and FIG. 4 is a diagram of the injection fluid flow rate as a function of time for the development of multiple hydraulic fractures in accordance with the invention.

DESCRIPTION OF PREFERRED EMBODIMENTS

In the description which follows like elements are marked throughout the specification and drawing with the same reference numerals. The drawing figures are schematic diagrams illustrating the method of the invention.

It is widely accepted that the in situ compressive stresses in the earth increase, generally, with depth. There are, however, certain zones or layers of earth material at various depths which, for one reason or another, exhibit in situ compressive stresses which are generally lower than zones above the zone in question. Such zones of lower compressive stress may be suitable for disposal of certain liquid wastes and slurried solids wastes, since the generally higher compressive stresses in the overburden zone, as well as an underburden zone, will prevent significant vertical growth of a hydraulic fracture out of the selected disposal zone.

It is also generally accepted that the compressive stresses in the earth in the vicinity of fluid being injected into a particular formation will usually result in the development of a fracture which extends in a generally vertical plane and will extend laterally or radially outward from a point of injection. If the point of injection is from a well penetrating the formation interval in question the fracture generally develops as a so-called two-winged fracture extending laterally or radially away from the wellbore in opposite directions and in the aforementioned vertical plane and wherein such plane is generally normal to the minimum in situ horizontal compressive stress. This type of fracture, when formed in a formation disposal interval preselected to have, for example, a lower compressive stress than a formation interval above the disposal interval, may be used to dispose of slurried solids and certain liquid waste material as long as the fracture does not intersect a zone from which certain fluids, including fresh water, may be produced or otherwise allowed to flow back to the surface.

The method of the present invention contemplates the formation of multiple hydraulic fractures which extend generally laterally away from a vertical, deviated or even horizontal well penetrating an earth formation. The fractures are considered to extend generally in a vertical plane or possibly in other directions and in opposite directions from the well to form the so-called two-winged fracture.

One somewhat inherent characteristic of hydraulically fractured earth formations is that the fracturing fluid will typically leak off through the fracture faces into the formation, leaving behind any entrained or slurried solids to build up on the fracture faces as "filter cake". This process may eventually plug the fracture from which leakoff is occurring. This, somewhat inherent characteristic of hydraulic fracturing with solids laden fluids may be used as an advantage in disposing of solids wastes through a disposal well by pumping such wastes in a slurry of water or other liquid, or a foam, into a selected formation zone to create the hydraulic fractures.

A single two-winged fracture in a preselected formation interval or disposal zone has, of course, a limited capacity to accept waste materials. Typically, a fracture may be "grown" or extended radially from a wellbore only a certain distance before fluid leakoff into the formation exceeds the maximum injection rate or the accumulation of the so-called filter cake on the fracture faces as well as at the radial extremity of the fracture will effectively prevent further extension. Moreover, it may be desirable to limit the radial and vertical growth of a fracture by controlling the solids content of the fracture fluid so that, for example, as the radial extent of the fracture approaches a predetermined limit, the solids content of the fluid may be increased to assure that a more rapid buildup of fracture plugging "filter cake" occurs, particularly, at the radial extremity of the fracture. Vertical growth of the fracture may be controlled by limiting the injection pressure to that which will not cause the fracture to break out into overburden or underburden zones, respectively.

Solids laden fluid may continue to be pumped into the well to fill the fracture back toward the well itself whereupon the injection rate may be decreased to the rate of leakoff into the fractured zone to allow relaxation or "closure" of the fracture in that portion which is substantially filled with solids. Then the fluid injection rate may be increased suddenly, preferably using a solids free fluid, to create a second fracture which may initially extend somewhat normal to the first fracture but, due to the in situ compressive stresses, will likely undergo a change in direction to that Which is substantially parallel to the initial fracture. The process may be repeated several times until fractures can no longer be extended from the wellbore and whereby a somewhat dendritic fracture pattern has developed, when viewed in a plane normal to the wellbore, which is capable of containing a substantial quantity of waste material.

FIG. 1 illustrates, in schematic form, an earth formation 10 through which a generally vertical well 12 extends to a formation zone or interval 14. The zone 14 has been identified from logging or core examination, for example, to have a predetermined permeability, preferably greater than about 1.0 millidarcies and, preferably, to be disposed below an overburden zone 16 which exhibits a higher in situ compressive stress than the zone 14 so that fractures extending within the zone 14 will not break out into the zone 16 and tend to grow toward the surface or to a zone in which waste material cannot be disposed. The zone 14 may be selected in accordance with the teaching of Perkins and Keck U.S. Pat. No. 5,314,265.

The well 12 is equipped with a conventional wellhead 18, a casing 20 and a fluid-injection tubing string 22 extending within the casing 20 and terminating at a conventional packer 24 to provide a wellbore space 26 which is in communication with the zone 14 through suitable casing perforations 28. The portion of the wellbore below the packer 24 may also be in a so-called open-hole condition.

Referring to FIGS. 1 and 2, these diagrams illustrate the creation of a two-winged hydraulically induced fracture having opposed fracture portions 32 and 34 which extend in a generally vertical plane, parallel to the central longitudinal axis of the well 12, and from the perforations 28. The vertical height of the fractures 32 and 34 is limited by the highly stressed overburden zone 16. Accordingly, the fractures 32 and 34 will tend to grow radially outwardly from the well 12 in opposite directions and may grow vertically downwardly to some extent in accordance with the teaching of U.S. Pat. No. 5,314,265. The fracture wings 32 and 34 may be created and extended by pumping a fracturing fluid through the tubing string 22 from the surface by way of a suitable injection pump 36 which may also be placed in communication with a source of slurried solids waste material including a charging and particle size reduction pump 38 which is in communication with a mixing tank 40. The arrangement of the charging and solids particle size reduction pump 38 and the tank 40 may be similar to that described in James E. Jackson U.S. Pat. No. 5,109,933 and assigned to the assignee of the present invention. The pump 36 may also be in communication with a source of fracturing fluid, indicated at 42, which does not have solids materials suspended therein and which may be a conventional hydraulic fracturing fluid, such as fresh water or sea water treated with a suitable gel composition or a fluid with a low concentration of solids including drilling fluid and slurries of solids wastes. The fracturing fluid may include guar or a cross linkable polymer of a type conventionally used in hydraulic fracturing of earth formations. Fluid flow rate may be monitored by a flowmeter 37 and fracturing pressure sensed by a suitable downhole pressure sensor 39.

The fractures 32 and 34 may be created by injecting, initially, a fracturing fluid without solids content therein or with a low concentration of solids to prevent premature buildup of filter cake on the opposed fracture faces 32a and 32b, for example, see FIG. 2. The radial extent of the fractures 32 and 34 may be monitored in accordance with the method and apparatus described in U.S. patent application Ser. No. 08/196,621, filed Feb. 14, 1994, by Robert F. Withers and assigned to the assignee of the present invention. The radial outermost point or "tip" of fracture 32 is illustrated in FIG. 2, by way of example, and indicated by numeral 33. Typically, as the fractures 32 and 34 are extended away from the well 12, the injection fluid is laden with increasing concentrations of solids particulates having a particle size in the range of about twenty to one hundred microns and slurried in a carrier liquid such as sea water. Suitable dispersants may be included in the slurry to maintain uniformity of the slurry composition. The injection rate is typically greater than the fluid leakoff rate to assure fracture extension which may, for example, be from one thousand feet to fifteen hundred feet radially outward from the well 12.

During injection of the solids laden slurry into the fractures 32 and 34, fluid pressure may be monitored at the wellbore 26 or at the surface and, of course, the flow rate of the injection fluid is monitored. FIGS. 3 and 4 show typical characteristics of injection pressure and injection fluid flow rate as a function of time, respectively. As the growth of the fractures 32 and 34 is monitored and the injection fluid is modified to include an increasing amount of solids particulates in slurry form, the volume of particulates being deposited in the fractures 32 and 34 may be monitored. If the fracture wings 32 and 34 cease to continue to extend radially outwardly and vertically downwardly, then a fixed volume is assumed. Once a predetermined volume of solids 42, for example, has accumulated in the fractures 32 and 34 the fluid being injected may cease to include solids particulates and the rate of injection may be decreased to the leakoff rate through the opposed fracture faces 32a and 32b, for example. Alternatively, the injection pressure may be monitored to detect when an approaching screenout condition may exist.

For example, FIG. 3 illustrates the initial increase in pressure P as a function of time wherein the traditional pressure peak 44 is observed which indicates the initiation of a fracture, that is, the so-called formation breakdown pressure. As the fracture continues to grow radially away from the well 12, the pressure being monitored may be substantially constant over a portion of the curve of FIG. 3 indicated at 46. If the fractures 32 and 34 are indicated to approach screenout as determined by the pressure increase at a point 48, for example, the fluid injection rate Q, see FIG. 4, may be reduced a predetermined amount from the initial rate 50 to a substantially lesser rate 52 which may be just slightly less than the fluid leakoff rate into the formation zone 14. The injection rate may be reduced down to substantially zero flow in some instances. The fluid pressure in the fractures 32 and 34 will then, typically, also decrease to the value 54 indicated in FIG. 3.

By monitoring, or estimating, fracture length and height and by measuring the volume of solids material deposited in the fracture from measured injection flow rates, the respective points 56 and 58 in the fractures 32 and 34 may be determined beyond which the fractures are packed with solids material. Accordingly, the fluid being injected into the fractures 32 and 34 is reduced when points 56 and 58 are determined, which points are preferably relatively close to the wellbore 26 and normally at least less than half the overall radial length of the fractures 32 and 34 away from the wellbore. With the reduction in fluid injection to the volumetric rate indicated at 52 in FIG. 4, for example, and the reduction in pressure in the formation indicated at 54 in FIG. 3, the fractures 32 and 34 will tend to relax or close at the points 56 and 58, respectively.

At this time fluid injection may be resumed at a substantially higher rate such as indicated at 60 in FIG. 4 with a concomitant rise in pressure to the formation breakdown pressure indicated at 62 in FIG. 3. The fluid being injected to generate the second cycle of pressure increase indicated in FIG. 3 is now, preferably, somewhat devoid of solids and may include a conventional gel type fracturing fluid to minimize fluid leakoff into the formation. Accordingly, as shown in FIG. 2, since the fractures 32 and 34 are now plugged with waste material beyond the points 56 and 58 and can no longer be radially extended, secondary fractures 66 and 68 will develop at approximately the points 56 and 58, respectively.

The fractures 66 and 68 may, initially, grow somewhat normal to the fractures 32 and 34. However, if the in situ compressive stresses of the formation zone 14 have not been substantially altered by the fractures 32 and 34, the fractures 66 and 68 will turn and extend generally parallel to the fractures 32 and 34. Fracture growth may be monitored by the above-mentioned method of Withers, for example. The fractures 66 and 68 may be grown radially away from the well 12 in substantially the same manner as described above for extension of the fractures 32 and 34 and the fluid being injected to create the fractures 66 and 68 may be modified to include increasing quantities solids particulates in a slurry which may be deposited in the fractures 66 and 68 while monitoring the growth of the fractures and the volume of material being injected.

Upon sensing screenout of the fractures 66 and/or 68, or as a result of determining from measured injection volumes and monitoring growth of the fractures that they are fully laden with solids particles, fluid injection is again decreased to a rate indicated at 72 which is substantially equal to or slightly less than the fluid leakoff rate into the formation from the fractures 66 and 68 and those portions of the fractures 32 and 34 between the well 12 and the points 56 and 58, respectively. The fluid pressure in the fractures 66 and 68 and the portions of the fractures 32 and 34 between the points 56 and 58 and the well 12 will also decline to the level indicated by numeral 74, resulting in relaxation of any elastic deflection of the formation faces defining the fractures 66 and 68 and some degree of closure thereof.

Third and successive fractures may be extended from the fractures 32 and 34 such as indicated at 76, 78 and 80 in FIG. 2 by repeating the injection process just described for establishing the fractures 66 and 68, respectively. Fractures may grow from the secondary fractures 66 and 68, also, and all such fractures may be monitored by the above-mentioned method of Withers. In this way a substantial multiple hydraulically fractured zone 14 may be established for storing waste material including, in particular, slurried solids wastes such as earth drill cuttings, contaminated earth material and other solids particulates which require containment in a remote storage space. Depending on the length or radial extent of the fractures 32 and 34, the number of secondary fractures such as the fractures 66, 68, 76, 78 and 80 may be established over a number of fluid injection cycles to provide from 10 to 15 secondary fractures extending directly or indirectly from the opposed primary fractures 32 and 34, for example.

Those skilled in the art will recognize that the above-described method of disposing of slurried solids wastes, in particular, will allow relatively large volumes of material to be injected through a single disposal well without unrestrained growth of the fractures into zones or layers of earth material from which fluids may be produced to the surface. The cost per unit volume of waste material should be reduced as compared with other methods of disposal. Moreover, the availability of earth formation disposal zones which have the characteristics of the disposal zone 14 is believed to be substantial compared with other types of earth formations which are available for disposal of certain liquid and slurried solids wastes.

Although a preferred embodiment of the present invention has been described in some detail herein, those skilled in the art will also recognize that various substitutions and modifications may be made to the inventive method without departing from the scope and spirit of the appended claims.

What is claimed is:

1. A method of disposing of waste material in an earth formation wherein said waste material is in the form of a slurry of particulate solids, comprising the steps of:

injecting said slurry into a disposal zone of said earth formation from an injection well and into a primary hydraulic fracture extending radially outward from said injection well;

continuing the injection of said slurry until at least one of a predetermined volume of waste material is deposited in said primary fracture from the radial tip of said primary fracture to a predetermined point in said primary fracture between said radial tip and said injection well or said primary fracture exhibits a screenout condition;

reducing the injection rate a predetermined amount; and establishing a secondary fracture extending substantially from said predetermined point into said disposal zone and injecting said slurry into said secondary fracture to substantially fill said secondary fracture with said waste material.

2. The method set forth in claim 1 including the steps of:

monitoring at least one of the radial extent and vertical extent of at least one of said fractures, measuring the volumetric flow of slurry through said well and into said one fracture and reducing the injection of said slurry into said one fracture when a predetermined volume of material has been deposited therein.

3. The method set forth in claim 1 including the step of:

establishing said secondary fracture by injecting a fracturing fluid substantially void of solids particles into said disposal zone through said well prior to injecting said slurry into said secondary fracture.

4. The method set forth in claim 1 including the step of:

reducing the injection of said slurry into at least one of said fractures when a fluid pressure is sensed which indicates that said one fracture is substantially filled with solids waste materials.

5. The method set forth in claim 4 including the step of:

reducing the rate of injection of fluid into said one fracture to a flow rate less than the fluid leakoff rate from said one fracture into said disposal zone.

6. The method set forth in claim 1 including the step of:

selecting a disposal zone for generation of said fracture which has an in situ compressive stress less than a zone of said earth formation disposed adjacent to and above said disposal zone.

7. A method of disposing of solids waste material in an earth formation comprising the steps of:

selecting a disposal zone of said earth formation having a predetermined permeability;

providing an injection well extending into said disposal zone;

providing said waste material in a slurry of particulate solids of said waste material;

injecting said slurry into said disposal zone through said well and into a primary hydraulic fracture extending radially outwardly from said well;

continuing the injection of said slurry for a predetermined period of time at a predetermined rate to deposit said particulate solids in said hydraulic fracture from a radial tip of said hydraulic fracture to a predetermined point between said radial tip and said well;

reducing the injection rate of said slurry a predetermined amount;

injecting a fracturing fluid into said disposal zone to establish a secondary fracture extending substantially from said primary fracture; and injecting a slurry of said waste material into said secondary fracture to substantially fill said secondary fracture with said waste material.

8. The method set forth in claim 7 including the step of:

selecting said disposal zone to have a permeability greater than about 1.0 millidarcies.

9. The method set forth in claim 7 including the step of:

selecting said disposal zone to have a minimum in situ stress therein less than the minimum in situ stress of a zone of said earth formation disposed adjacent to and above said disposal zone.

10. The method set forth in claim 7 including the step of:

preparing said slurry of waste material to have particulate solids in a particle size range of about 20 microns to 100 microns.

11. The method set forth in claim 7 wherein:

said secondary fracture is established by injecting a fracturing fluid having a predetermined leakoff rate with respect to said disposal zone.

12. A method of disposing of particulate solids wastes in an earth formation comprising the steps of:

selecting a disposal zone of said earth formation having an in situ compressive stress distribution less than the in situ compressive stress distribution of a zone adjacent to and above said disposal zone, said disposal zone having a permeability greater than about 1.0 millidarcies;

establishing an injection well extending into said disposal zone;

preparing a slurry of said particulate solids by reducing the particle size of said waste material to a range of about 20 microns to 100 microns and suspended in a carrier liquid;

injecting said slurry into said disposal zone from said injection well to generate a primary hydraulic fracture extending radially outward from said injection well and substantially vertically within said disposal zone;

continuing the injection of said slurry into said fracture until at least one of a predetermined volume of waste material is deposited in said primary fracture or said primary fracture exhibits a screenout condition;

reducing the injection rate of slurry into said injection well to a rate which is not greater than the leakoff rate of said carrier liquid into said disposal zone from said primary fracture; and injecting fracturing fluid through said injection well into said disposal zone at a rate sufficient to generate a secondary fracture extending from said primary fracture.

13. The method set forth in claim 12 including the step of:

injecting a slurry of waste material in a carrier liquid into said secondary fracture to deposit said waste material in said secondary fracture.

14. The method set forth in claim 13 including the step of:

continuing the injection of said slurry into said secondary fracture until at least one of tip screenout occurs in said secondary fracture and a predetermined quantity of said waste material is deposited in said secondary fracture; and reducing the injection rate of fracture fluid into said secondary fracture to a rate not substantially greater than the fluid leakoff rate from said secondary fracture into said disposal zone.

* * * * *